United States Patent
Ikarashi et al.

(10) Patent No.: US 10,003,460 B2
(45) Date of Patent: Jun. 19, 2018

(54) SECRET QUOTIENT TRANSFER DEVICE, SECRET BIT DECOMPOSITION DEVICE, SECRET MODULUS CONVERSION DEVICE, SECRET QUOTIENT TRANSFER METHOD, SECRET BIT DECOMPOSITION METHOD, SECRET MODULUS CONVERSION METHOD, AND PROGRAMS THEREFOR

(71) Applicant: NIPPON TELEGRAPH AND TELEPHONE CORPORATION, Chiyoda-ku (JP)

(72) Inventors: Dai Ikarashi, Musashino (JP); Ryo Kikuchi, Musashino (JP); Koki Hamada, Musashino (JP); Koji Chida, Musashino (JP)

(73) Assignee: NIPPON TELEGRAPH AND TELEPHONE CORPORATION, Chiyoda-ku (JP)

(*) Notice: Subject to any disclaimer, the term of this patent is extended or adjusted under 35 U.S.C. 154(b) by 137 days.

(21) Appl. No.: 15/025,394

(22) PCT Filed: Oct. 3, 2014

(86) PCT No.: PCT/JP2014/076532
§ 371 (c)(1),
(2) Date: Mar. 28, 2016

(87) PCT Pub. No.: WO2015/053185
PCT Pub. Date: Apr. 16, 2015

(65) Prior Publication Data
US 2016/0218862 A1 Jul. 28, 2016

(30) Foreign Application Priority Data
Oct. 10, 2013 (JP) ................................ 2013-213027

(51) Int. Cl.
*H04L 9/08* (2006.01)
*G09C 1/00* (2006.01)

(52) U.S. Cl.
CPC ................. *H04L 9/085* (2013.01); *G09C 1/00* (2013.01); *H04L 2209/46* (2013.01)

(58) Field of Classification Search
None
See application file for complete search history.

(56) References Cited

U.S. PATENT DOCUMENTS

| 5,010,573 A * | 4/1991 | Musyck ................ H04L 9/0637 380/28 |
| 6,993,136 B2 * | 1/2006 | Solinas ................ H04L 9/0841 380/278 |
| 2003/0112969 A1* | 6/2003 | Algesheimer ............ G06F 7/72 380/28 |

OTHER PUBLICATIONS

Bos et al, "Efficient SIMD arimthmetic modulo a Mersenne number", no date provided, Microsoft Research, p. 1-10.*

(Continued)

*Primary Examiner* — Christopher Revak
(74) *Attorney, Agent, or Firm* — Oblon, McClelland, Maier & Neustadt, L.L.P.

(57) ABSTRACT

A secret quotient transfer device that can reduce the communication cost. On the assumption that u denotes a natural number and represents a boundary value, m denotes an integer that satisfies a relation $m \leq 2^u$, i denotes an integer from 0 to m−1, a plain text a is an integer that is equal to or greater than 0 and smaller than an arbitrary modulo p, the integers a and 0 are congruent modulo $2^u$, and the plain text a is expressed as a sum of m sub-shares $x_0, \ldots, x_{m-1}$, the secret quotient transfer device computes a quotient q of the division of a total sum $a_Z$ of the sub-shares by p according to $q = \Sigma(i<m)x^i \mod 2^u$.

9 Claims, 10 Drawing Sheets

(56) References Cited

OTHER PUBLICATIONS

Efstathiou et al, "Modified Booth Modulo 2n-1 Multipliers", Mar. 2004, IEEE Transactions on Computers, vol. 53, p. 370-374.*
International Search Report dated Nov. 25, 2014 in PCT/JP2014/076532 Filed Oct. 3, 2014.
Damgard, et al., "Unconditionally Secure Constant-Rounds Multi-party Computation for Equality, Comparison, Bits and Exponentiation," TCC, LNCS, vol. 3876, pp. 285-304, 2006.
Cramer, et al., "Share Conversion, Pseudorandom Secret-Sharing and Applications to Secure Computation," TCC, LNCS 3378, pp. 342-362, 2005.
Bogdanov, et al., "High-performance secure multi-party computation for data mining applications," Int. J. Inf. Secur., vol. 11, No. 6, 2012 (16 pages).
Supplementary Partial European Search Report dated May 10, 2017 in European Patent Application No. 14851517.4.
Extended Search Report dated Sep. 15, 2017 in European Patent Application No. 14851517.4.

* cited by examiner

SECRET QUOTIENT TRANSFER DEVICE, SECRET BIT DECOMPOSITION DEVICE, SECRET MODULUS CONVERSION DEVICE, SECRET QUOTIENT TRANSFER METHOD, SECRET BIT DECOMPOSITION METHOD, SECRET MODULUS CONVERSION METHOD, AND PROGRAMS THEREFOR

TECHNICAL FIELD

The present invention generally relates to a technical field of secret computation that involves processing data while concealing the data by secret sharing and, in particular, to a secret quotient transfer device, a secret bit decomposition device, a secret modulus conversion device, a secret quotient transfer method, a secret bit decomposition method, a secret modulus conversion method, and programs therefor.

BACKGROUND ART

In the technical field of secret computation that involves processing data while concealing the data by secret sharing, there is a known conventional technique (referred to as "share quotient computation") that involves determining a quotient q of the division by a value p of a sum $a_Z$ of a sequence of distributed numbers $x_0, \ldots, x_{m-1}$ that are smaller than an arbitrary modulo p (that is, a value q in an expression $a_Z = a + qp$, where $0 \leq a < p$, and $0 \leq q < m$):

[Formula 1]

$$a_Z := \sum_{i<m} x_i$$

A technique that achieves the share quotient computation is bit decomposition (Non-patent literature 1).

PRIOR ART LITERATURE

[Non-Patent Literature]

Non-patent literature 1: I. Damgard, M. Fitzi, E. Kiltz, J. B. Nielsen, and T. Toft, Unconditionally secure constant-rounds multi-party computation for equality, comparison, bits and exponentiation. In S. Halevi and T. Rabin eds, TCC, Vol. 3876 of Lecture Notes in Computer Science, pp. 285-304 Springer, 2006.

SUMMARY OF THE INVENTION

Problems to be Solved by the Invention

The conventional technique described above has a problem that, provided that the value p has a bit length of |p|, the traffic is O (|p|²) bits, and the communication cost is high. In view of such circumstances, an object of the present invention is to provide a secret quotient transfer device that can reduce the communication cost.

Means to Solve the Problems

A secret quotient transfer device according to the present invention computes a quotient q according to

[Formula 6]

$$q = -\sum_{i<m} x_i \mod 2^u, \qquad (1)$$

on the assumption that

[Formula 2]

$$x \underset{y}{\equiv} z$$

is a formula that expresses that integers x and z are congruent modulo y, u denotes a natural number and represents a boundary value, m denotes an integer that satisfies a relation $m \leq 2^u$, i denotes an integer from 0 to m−1, a plain text a is an integer that is equal to or greater than 0 and smaller than an arbitrary modulo p and satisfies a relation

[Formula 3]

$$a \underset{2^u}{\equiv} 0,$$

a is expressed as a sum of m sub-shares $x_0, \ldots, x_{m-1}$ as

[Formula 4]

$$a \underset{p}{\equiv} \sum_{i<m} x_i,$$

a total sum $a_Z$ of the sub-shares is expressed as

[Formula 5]

$$a_Z = \sum_{i<m} x_i,$$

and q is a quotient of the division of the total sum aZ of the sub-shares by p.

Effects of the Invention

The secret quotient transfer device according to the present invention can reduce the communication cost.

DETAILED DESCRIPTION OF THE EMBODIMENTS

Figure 1:
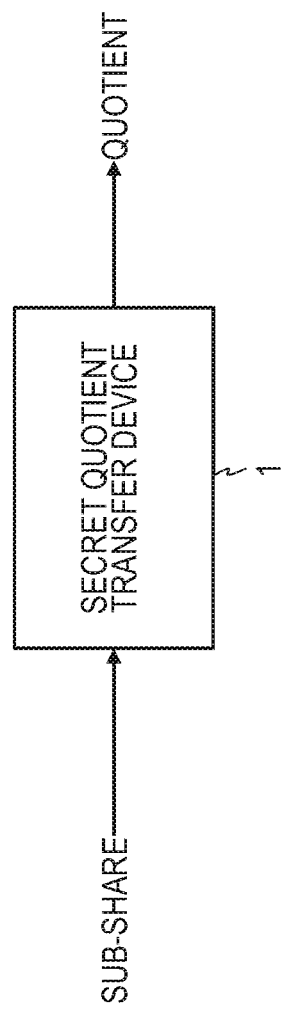
FIG. 1 is a block diagram showing a configuration of a secret quotient transfer device according to a first embodiment.

In the following, embodiments of the present invention will be described in detail. The components having the same functions are denoted by the same reference numerals, and redundant descriptions thereof will be omitted.

First Embodiment

Description of Terms

In the following, terms used in this specification will be described.

[semi-honest]

"Semi-honest" means that an attacker peeps at data but performs a correct processing.

[malicious]

"Malicious" means that an attacker performs any unauthorized operation.

<Notation>

In the following, a notation commonly used in this specification will be described.

[Formula 7]

$$x \underset{y}{\equiv} z$$

means that integers x and z are congruent modulo y. For any proposition P, [P] denotes an operator that converts whether the proposition P is true or false into an integer. Typically, the operator returns 1 if P is true and 0 if P is false.

<Assumption>

In the present invention, in general, it is assumed that a data type that represents a number smaller than p actually stores a context-dependent number smaller than M. For example, with a common computer, a 32-bit integer can store 1-bit data (M=2) that represents "sex". The number M of bits is denoted as 1. According to the present invention, taking such cases into account, very quick share quotient computation is achieved with a bit traffic (O(l) for |p|) that does not depends on |p|. The speedup of the share quotient computation leads to speedup of many processings in the field of secret computation, such as bit decomposition and modulus conversion.

<Secret Quotient Transfer Device 1>

Figure 2:
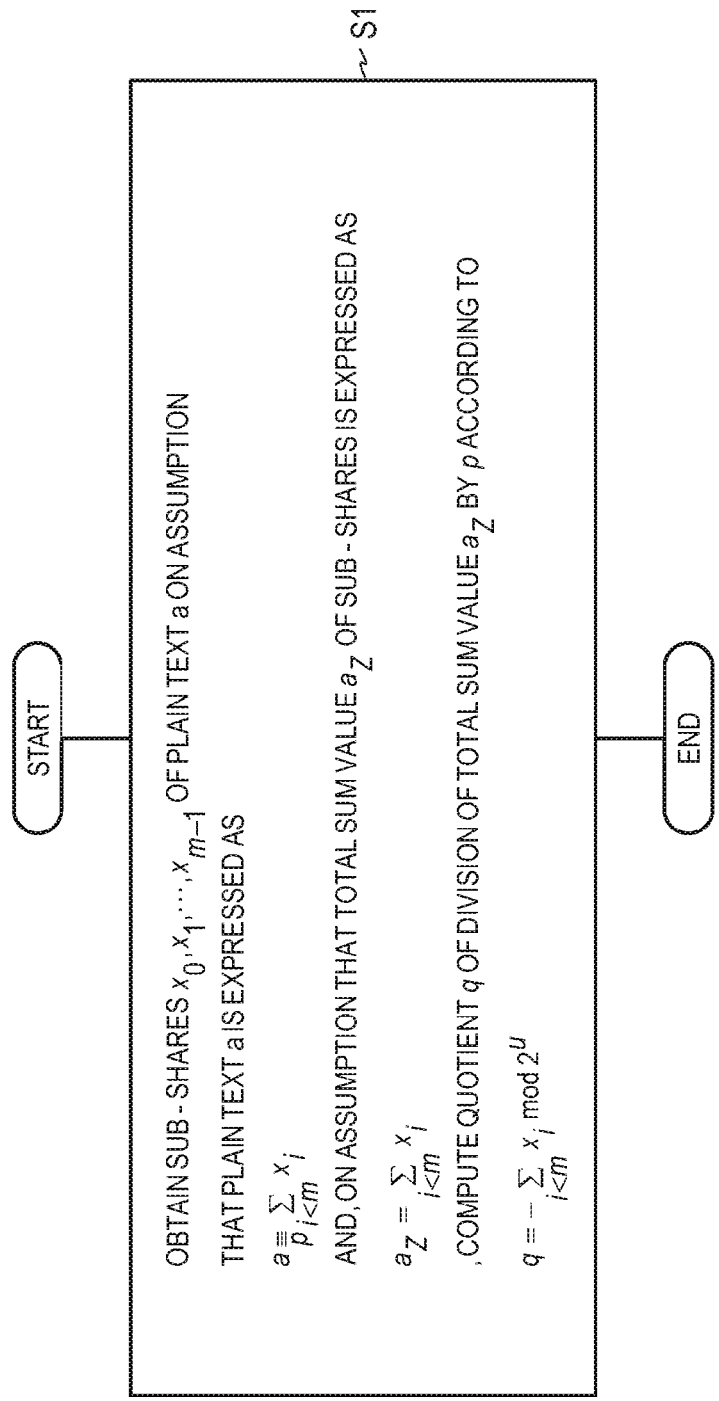
FIG. 2 is a flowchart showing an operation of the secret quotient transfer device according to the first embodiment.

In the following, a secret quotient transfer device according to a first embodiment will be described with reference to FIGS. 1 and 2. FIG. 1 is a block diagram showing a configuration of a secret quotient transfer device 1 according to this embodiment. FIG. 2 is a flowchart showing an operation of the secret quotient transfer device 1 according to this embodiment.

It is assumed that u denotes a natural number and represents a boundary value, m denotes an integer that satisfies a relation $m \leq 2^u$, i denotes an integer from 0 to m−1, a plain text a is an integer that is equal to or greater than 0 and smaller than an arbitrary modulo p ($0 \leq a < p$) and satisfies a relation

[Formula 3]

$$a \underset{2^u}{\equiv} 0$$

and a is expressed as a sum of $x_0, \ldots, x_{m-1}$ as

[Formula 9]

$$a \underset{p}{\equiv} \sum_{i<m} x_i$$

Each item $x_i$ is referred to as a sub-share of a, where i denotes an integer on 0 to m−1. A total sum $a_Z$ of the sub-shares is expressed as

[Formula 10]

$$a_Z = \sum_{i<m} x_i,$$

and q is a quotient of the division of the total sum $a_Z$ by p. The secret quotient transfer device 1 according to this embodiment receives sub-shares transmitted from a plurality of devices. The secret quotient transfer device 1 computes the quotient q according to

[Formula 11]

$$q = -\sum_{i<m} x_i \mod 2^u, \qquad (1)$$

and outputs the computed quotient q (S1). That is, when the secret quotient transfer device 1 obtains a bit representation of each sub-share $x_i$, the secret quotient transfer device 1 can compute the quotient by passing the lower u bits of the respective bit representations through an adding circuit or a subtracting circuit. With the secret quotient transfer device 1 according to this embodiment, it is to be noted that computation for the bits higher than the u-th bit is not necessary. The secret quotient transfer device 1 and a secret quotient transfer method disclosed in this embodiment have many applications in the field of secret computation that involves performing a processing of secret-shared data while concealing the data. Such applications will be described later with regard to second and third embodiments.

Before describing those embodiments, secret sharing will be described.

<(k, n)-Linear Secret Sharing>

A (k, n)-secret sharing is a data sharing scheme in which a plain text is divided into n shares, which are to be distributed, the plain text can be reconstructed by collecting k of the n shares, and collecting k−1 or less of the n shares do not provide any information on the plain text.

The (k, n)-linear secret sharing is defined herein as follows. If a function

[Formula 12]

$$SHARE_{pr} : R \to \prod_{i<n} R^{m_i}$$

represents a (k, n)-linear secret sharing, the sequence of coefficients for reconstruction described below exists for an arbitrary injection σ: {0, ..., k−1→0, ..., n−1}. σ represents that k shares are arbitrarily selected from among n shares. Note that R denotes a commutative group, and C denotes a set that defines a product of multiplication by R.

<Reconstruction>

It is assumed that there is a sequence of coefficients

[Formula 13]

$$(\lambda_0, \ldots, \lambda_{k-1}) \in \prod_{i<k} C^{m_{\sigma(i)}},$$

and $SHARE_{pr}(a)$ for any input a in a formula

[Formula 14]

$$\sum_{i<k} \sum_{j<m_{\sigma(j)}} (\lambda_i)_j (SHARE_{pr}(a)_{\sigma(i)})_j = a$$

is referred to as a linear secret sharing value and denoted as [a]. For each number i∈{0, ..., n−1}, $SHARE_{pr}(a)_i$ is denoted as $[a]_i$ and referred to as an i-th share or a share of a party i. The Shamir secret sharing is a representative (k, n)-linear secret sharing. According to the Shamir secret sharing, the sequence of coefficients is Lagrange coefficients in the Lagrange interpolation. Of various types of linear secret sharing, in the present invention, it is assumed that the duplicate secret sharing described below is particularly used.

<Duplicate Secret Sharing>

The duplicate secret sharing is the secret sharing described below. First, using $m(=_nC_{k-1})$ elements $a_0, \ldots, a_{m-1}$ of the commutative group R, the plain text a is expressed as

[Formula 15]

$$a = \sum_{i<m} a_i$$

For each set of k−1 parties (an i-th set of k−1 parties is denoted as $P_i$), all the parties that do not belong to a party $P_i$ have an element $a_i$. On such an assumption, security is ensured if up to k−1 parties act in collusion, since any set of k−1 parties lack a certain element $a_i$. On the other hand, if k parties are gathered, any element $a_i$ is always owned by some party, and therefore, the plain text can be reconstructed. Thus, this is a (k, n)-secret sharing. Each element $a_i$ is referred to as a sub-share. According to (2, 3)-duplicate secret sharing, for example, $a=a_0+a_1+a_2$, and shares of the parties are denoted as $(a_0, a_1)$, $(a_1, a_2)$, and $(a_2, a_0)$.

Figure 3:
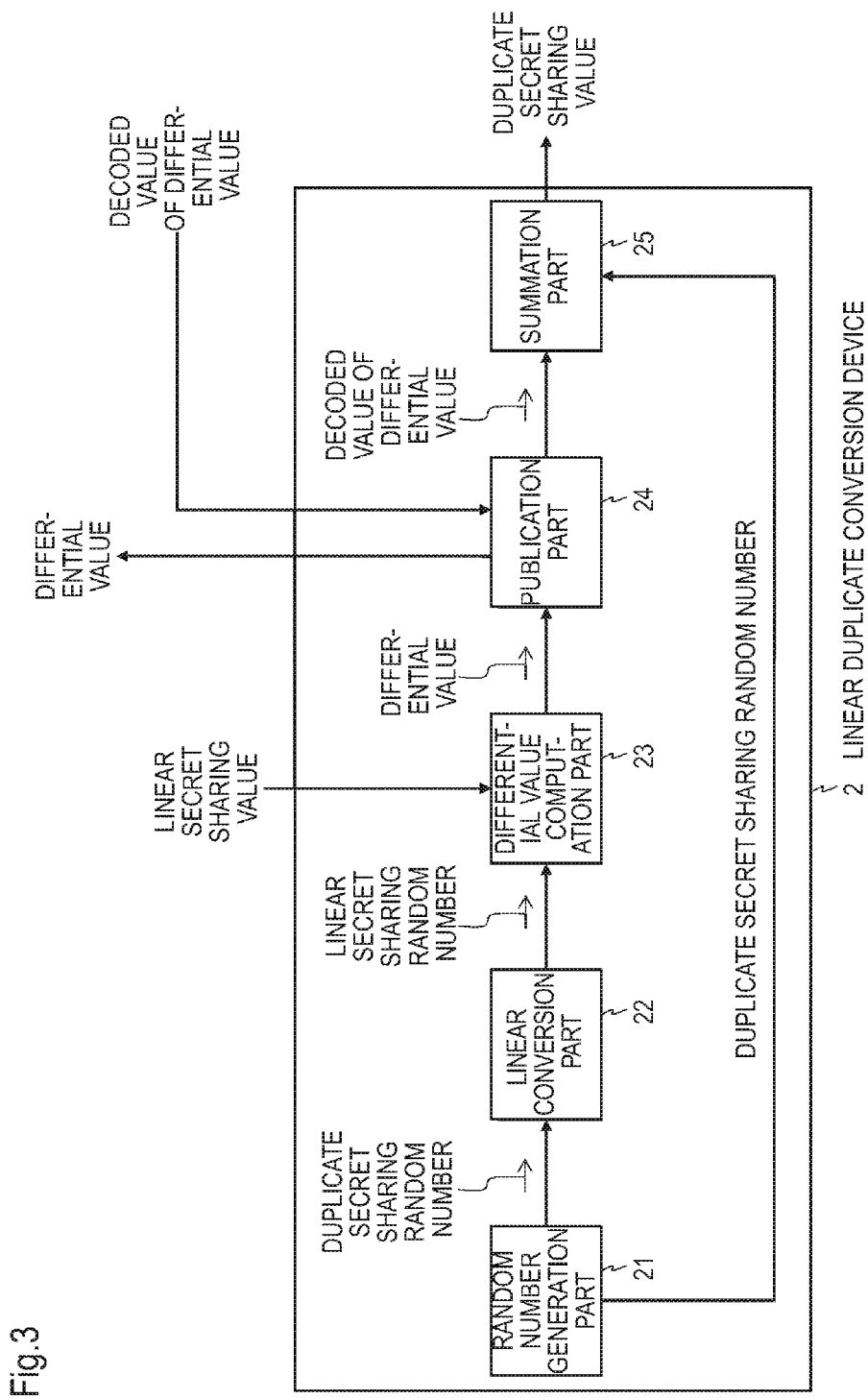
FIG. 3 is a block diagram showing a configuration of a linear duplicate conversion device.
Figure 4:
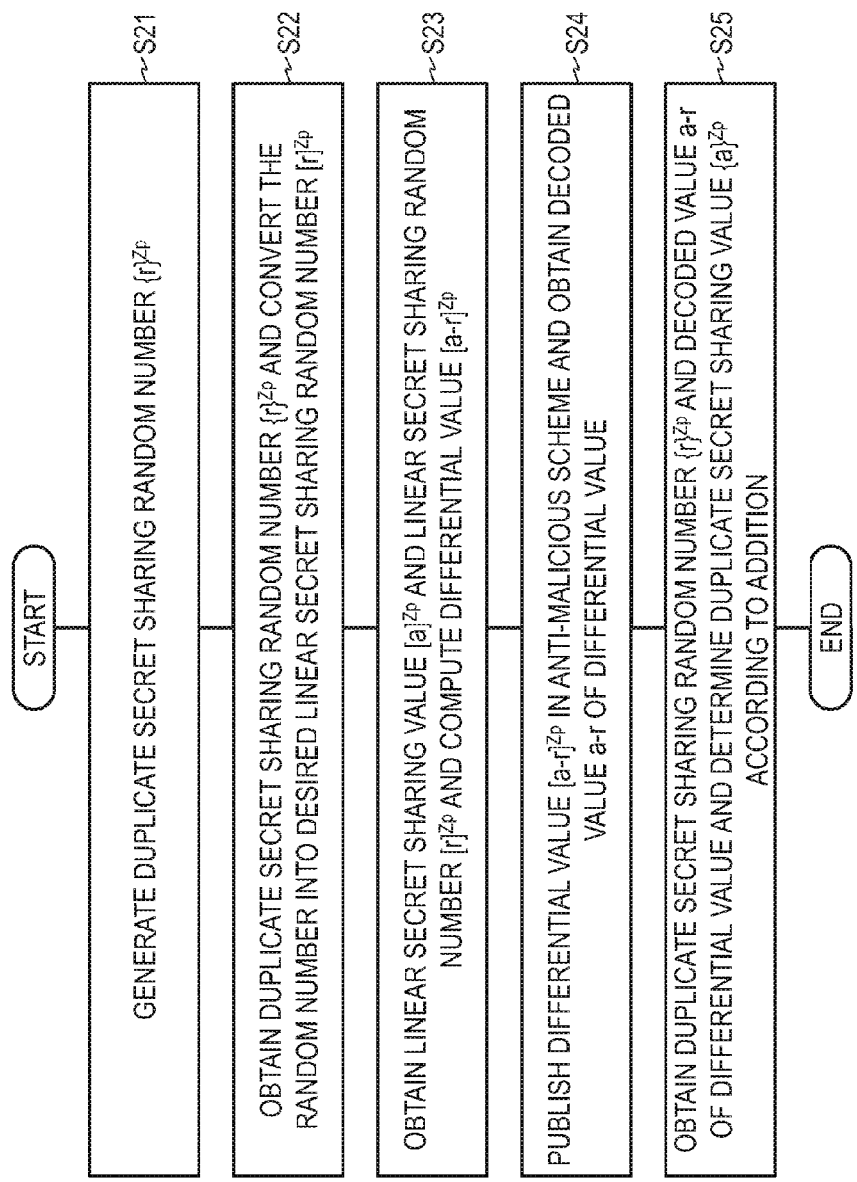
FIG. 4 is a flowchart showing an operation of the linear duplicate conversion device.

A secret sharing value of the duplicate secret sharing is denoted by {a}, and a share of an i-th party is denoted as ${\{a\}}_i$. Provided that j denotes an integer from 0 to m−1, a j-th sub-share is denoted as $\{a\}<j>$. In a semi-honest protocol according to the present invention, a (k, k)-duplicate secret sharing is used. The (k, k)-duplicate secret sharing has an advantage that it is efficient because only k-person each have one share. The (k, k)-duplicate secret sharing further has another advantage that it can be simply converted offline from any (k, n)-linear secret sharing. That is, k parties (which can be any k parties, although they are described as k parties from a party 0 to a party k−1 in this specification for the sake of simplicity) are arbitrarily selected, and the share of each party i (i<k) according to the (k, k)-duplicate secret sharing can be determined by simply multiplying the share according to the (k, n)-linear secret sharing by a coefficient for reconstruction as follows. $\{a\}_i = \lambda_i [a]_i$ In the following, a linear duplicate conversion device 2 that uses a (k, n)-duplicate secret sharing according to an anti-malicious protocol that can be used in the present invention will be described with reference to FIGS. 3 and 4. FIG. 3 is a block diagram showing a configuration of the linear duplicate conversion device 2. FIG. 4 is a flowchart showing an operation of the linear duplicate conversion device 2. An input to the linear duplicate conversion device 2 and an output from the linear duplicate conversion device 2 are as follows.

Input: linear secret sharing value $[a]^{Zp}$
Output: duplicate secret sharing value $\{a\}^{Zp}$ As shown in FIG. 3, the linear duplicate conversion device 2 comprises a random number generation part 21, a linear conversion part 22, a differential value computation part 23, a publication part 24, and a summation part 25. The random number generation part 21 generates a duplicate secret sharing random number $\{r\}^{Zp}$ (S21). The linear conversion part 22 obtains the duplicate secret sharing random number $\{r\}Z^p$ and converts the random number into a linear secret sharing random number $[r]^{Zp}$ (S22). The differential value computation part 23 obtains the linear secret sharing value $[a]^{Zp}$ and the linear secret sharing random number $[r]^{Zp}$ and computes a differential value $[a-z]^{Zp}$ (S23). The publication part 24 publishes the differential value $[a-r]^{Zp}$ in an anti-malicious scheme (see Non-patent literature 1, for example) and obtains a decoded value a−r of the differential value (S24). The summation part 25 obtains the duplicate secret sharing random number $\{r\}^{Zp}$ and the decoded value a−r of the differential value and determines a duplicate secret sharing value $\{a\}^{Zp}$ according to an addition $(a-r) + \{r\}^{Zp} = \{a\}^{Zp}$ (S25). Unlike the (k, k)-duplicate secret sharing, the (k, n)-duplicate secret sharing has an advantage that it can be converted offline into any (k, n)-linear secret sharing (for details, see Reference non-patent literature 1).

Reference non-patent literature 1: R. Cramer, I, Damgarg, and Y. Ishai, Share conversion, pseudorandom secret-sharing and applications to secure computation. In J. Kilian ed., TCC, Vol. 3378 of Lecture Notes in Computer Science, pp. 342-362. Springer, 2005.

Second Embodiment

Secret Bit Decomposition Device

Figure 5:
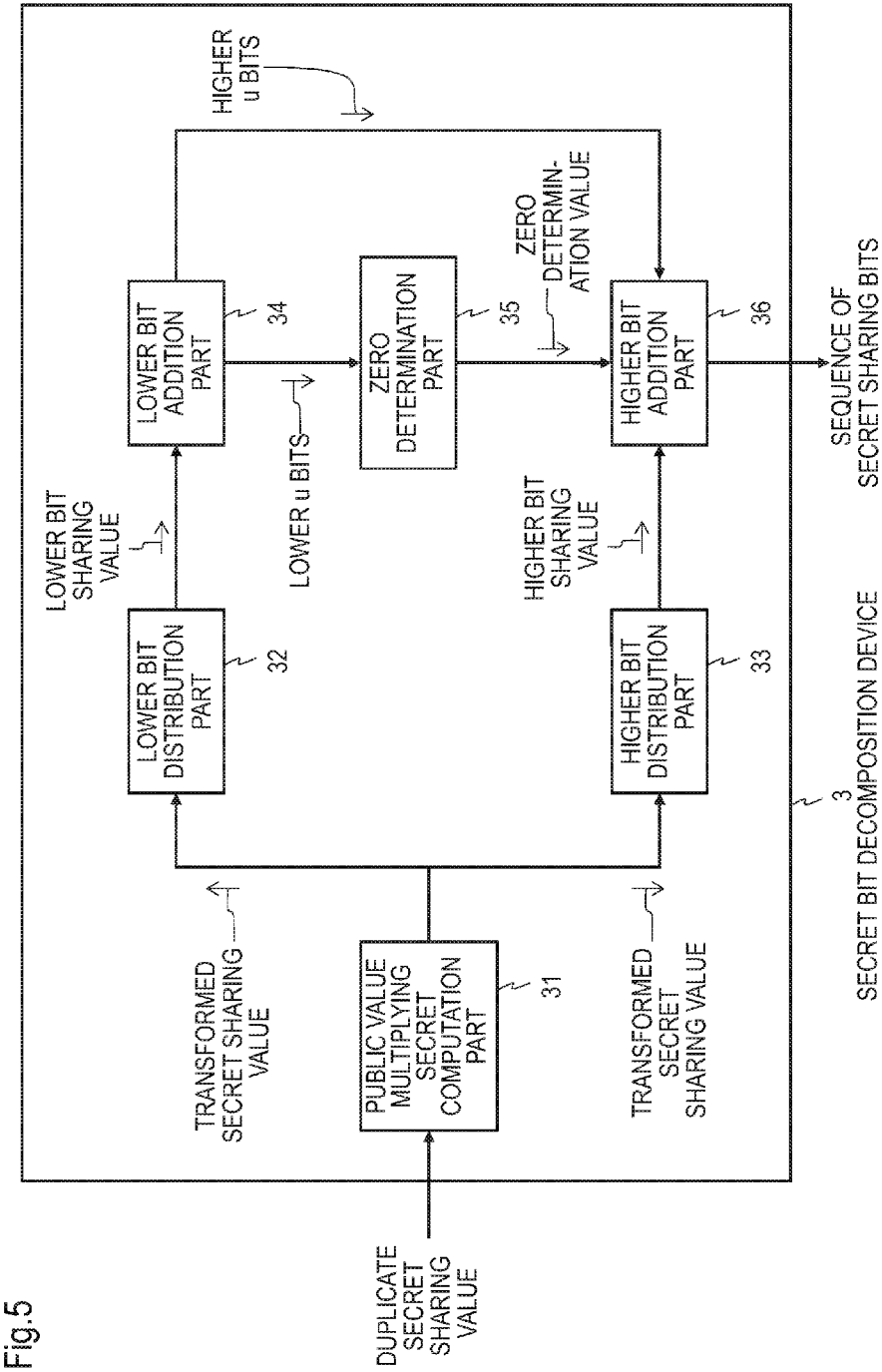
FIG. 5 is a block diagram showing a configuration of a secret bit decomposition device according to a second embodiment.
Figure 6:
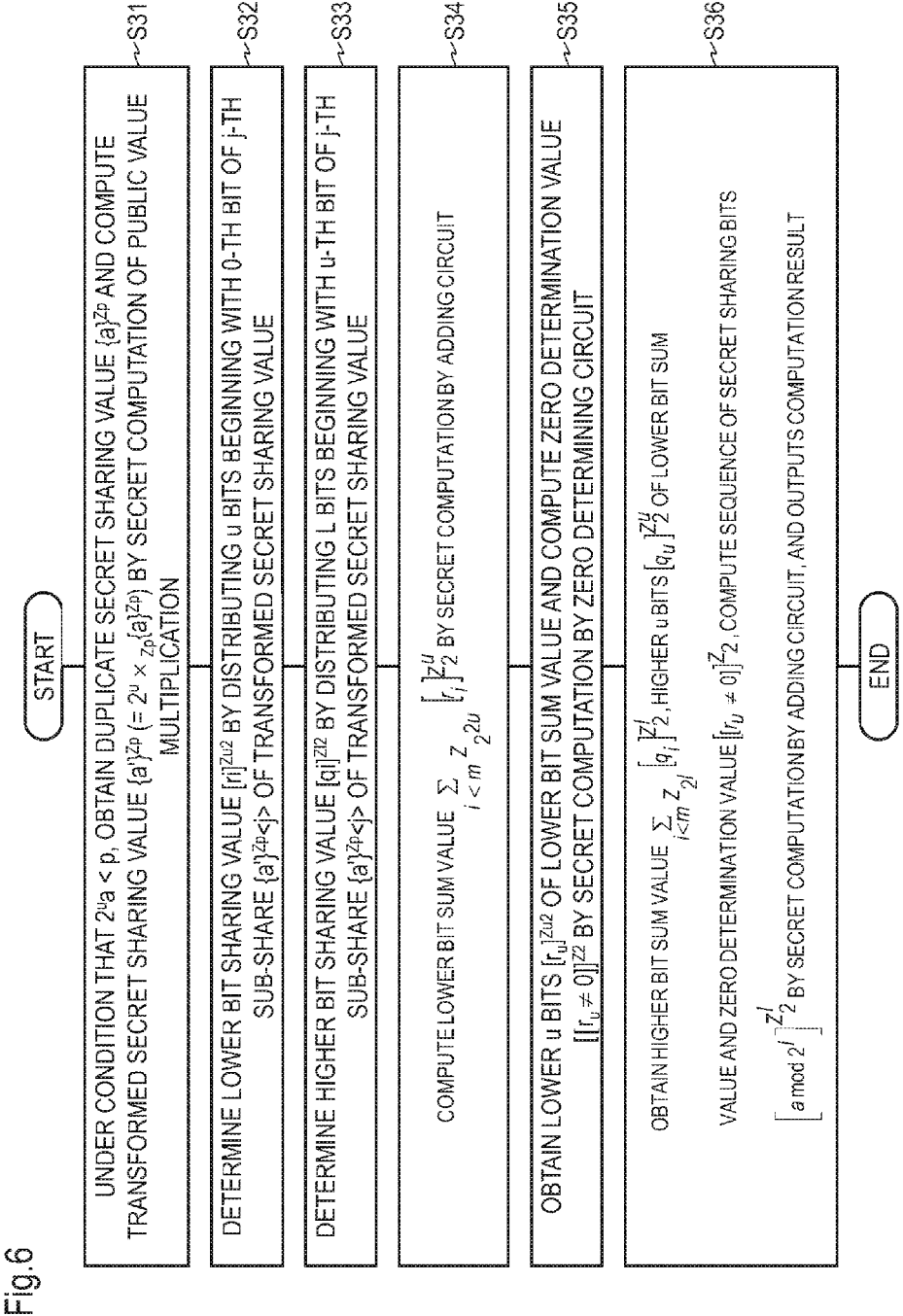
FIG. 6 is a flowchart showing an operation of the secret bit decomposition device according to the second embodiment.

In the following, a secret bit decomposition device according to a second embodiment will be described with reference to FIGS. 5 and 6. FIG. 5 is a block diagram showing a configuration of a secret bit decomposition device 3 according to this embodiment. FIG. 6 is a flowchart showing an operation of the secret bit decomposition device 3 according to this embodiment. As shown in FIG. 5, the secret bit decomposition device 3 comprises a public value multiplying secret computation part 31, a lower bit distribution part 32, a higher bit distribution part 33, a lower bit addition part 34, a zero determination part 35, and a higher bit addition part 36.

Bit decomposition is an operation of converting a secret sharing value $[a]^{Zp}$ of a number a smaller than M into a sequence of 1 secret sharing values as follows.

$$[a]^{Z_{2^l}} = ([a_0]^{Z_2}, \ldots, [a_{l-1}]^{Z_2}) \quad \text{[Formula 16]}$$

In this formula, each of the numbers $a_0, \ldots, a_{l-1}$ denotes a bit (0 is the least significant bit) of a binary representation of the number a. $[\bullet]^{Zp}$ and $[\bullet]^{Z_2}$ may be the same type of secret sharing or different types of secret sharing.

$$[\bullet]^{Z_2^l} \quad \text{[Formula 17]}$$

represents a secret sharing sequence of the type $[\bullet]^{Z_2}$ having a length of 1. The secret computation basically involves addition and multiplication, so that the arithmetic operation is quick, but the result of the arithmetic operation may be a numerical value that exceeds one bit. On the other hand, a logic circuit, which is slow but can perform any processing, receives a 1-bit value as an input and provides a 1-bit value as an output. The bit decomposition is a processing that bridges the two and involves quickly performing an arithmetic operation and then converting the resulting numerical value into a sequence of 1-bit values for any subsequent processing. The bit decomposition is essential for practical secret computation.

<Secret Bit Decomposition According to Second Embodiment>

In the following, a secret bit decomposition method performed by the secret bit decomposition device 3 according to this embodiment will be described with reference to FIG. 6. It is assumed that p denotes a Mersenne prime number. That is, p denotes a prime number that satisfies a condition that $2^p-1$ is a prime number. It is also assumed that $(x_0, \ldots, x_{m-1})$ are sub shares of a ($0 \le a < p$). It is also assumed that the boundary value u is denoted as $\lceil \log m \rceil$, $q_i$ and $r_i$ denote numerical values that represent the u-th and the following bits and the (u−1)-th and the preceding bits of xi, respectively, and $q_u$ and $r_u$ denote numerical values that represent the u-th and the following bits and the (u−1)-th and the preceding bits of $$\sum_{i<k} r_i \quad \text{[Formula 18]}$$

Then, from the formula (1), the following equation holds on the assumption that 1 satisfies a condition that $1+u \le |p|$.

$$a \equiv \sum_{i<m} q_i + q_u + [r_u \ne 0] \quad (2) \quad \text{[Formula 19]}$$

From this, an algorithm for duplicate secret sharing according to this embodiment is derived. The algorithm is to compute the formula (2). The traffic is |p| and is O(l) bits for 1, which is independent of p, and the communication is fast.

The duplicate secret sharing can be converted from any linear secret sharing (Reference non-patent literature 1), and the fact that the input is limited to the format of the duplicate secret sharing is not a limitation in practice.

An input to the secret bit decomposition device 3 and an output of the secret bit decomposition device 3 are as follows.

Input: $\{a\}^{Zp}$, where $2^u a < p$
Output: a sequence of secret sharing bit values $$[a \bmod 2^l]^{Z_2^l} \quad \text{[Formula 20]}$$

Parameters: m represents the number of sub-shares (m∈N), $u = \lceil \log m \rceil$, and p represents a prime number.

Under the condition that $2^u a < p$, the public value multiplying secret computation part 31 obtains the duplicate secret sharing value $\{a\}^{Zp}$ and computes a transformed secret sharing value $\{a'\}^{Zp}$ ($= 2^u \times_{Zp} \{a\}^{Zp}$) by a secret computation of public value multiplication (S31). For example, for an arbitrary integer b smaller than p, a public value multiplication $b \times_{Zp} \{a\}^{Zp}$ of the duplicate secret sharing is achieved by multiplying each sub-share of $\{a\}$ by b. A public value multiplication $b \times_{Zp} [a]^{Zp}$ of the (k, n)-linear secret sharing is achieved by multiplying each sub-share of [a] by b. The arithmetic symbol "×" or the like described above means that the arithmetic operation is performed separately for each algebraic structure that performs the arithmetic operation. Subsequent steps S32, S33, S34 and S36 are performed for every i that satisfies a condition that i<m. The lower bit distribution part 32 determines a lower bit sharing value $$[r_i]^{Z_2^u} \quad \text{[Formula 21]}$$

by distributing u bits beginning with the 0-th bit of a j-th sub-share $\{a'\}^{Zp}\langle j \rangle$ of the transformed secret sharing value (S32). The higher bit distribution part 33 determines a higher bit sharing value $$[q_i]^{Z_2^l} \quad \text{[Formula 22]}$$

by distributing 1 bits beginning with the u-th bit of the j-th sub-share $\{a'\}^{Zp}\langle j \rangle$ of the transformed secret sharing value (S33). The lower bit addition part 34 computes a lower bit sum value $$\sum_{i<m} Z_{2^u} [r_i]^{Z_2^u} \quad \text{[Formula 23]}$$

by a secret computation by an adding circuit (S34). In the following, the lower u bits of the lower bit sum value is denoted as, $$[r_u]^{Z_2^u} \quad \text{[Formula 24]}$$

and the higher u bits of the same is denoted as $$[q_u]^{Z_2^u} \quad \text{[Formula 25]}$$

The zero determination part 35 obtains the lower u bits of the lower bit sum value and computes a zero determination value $[[r_u \neq 0]]^{Z_2}$ by a secret computation by a zero determining circuit (S35). The higher bit addition part 36 obtains the higher bit sharing value, the higher u bits of the lower bit sum value and the zero determination value, computes a sequence of secret sharing bit values

[Formula 26]

$$[a \mod 2^l]_2^{z_2^l} = \sum_{i<m} z_{2^l}[q_i]_2^{z_2^l} +_{z_{2^l}} [q_u]_2^{z_2^u} +_{z_{2^l}} \square[r_u \neq 0\square]^{Z_2}$$

by a secret computation by the adding circuit, and outputs the result (S36).

[Modification 1]

Figure 7:
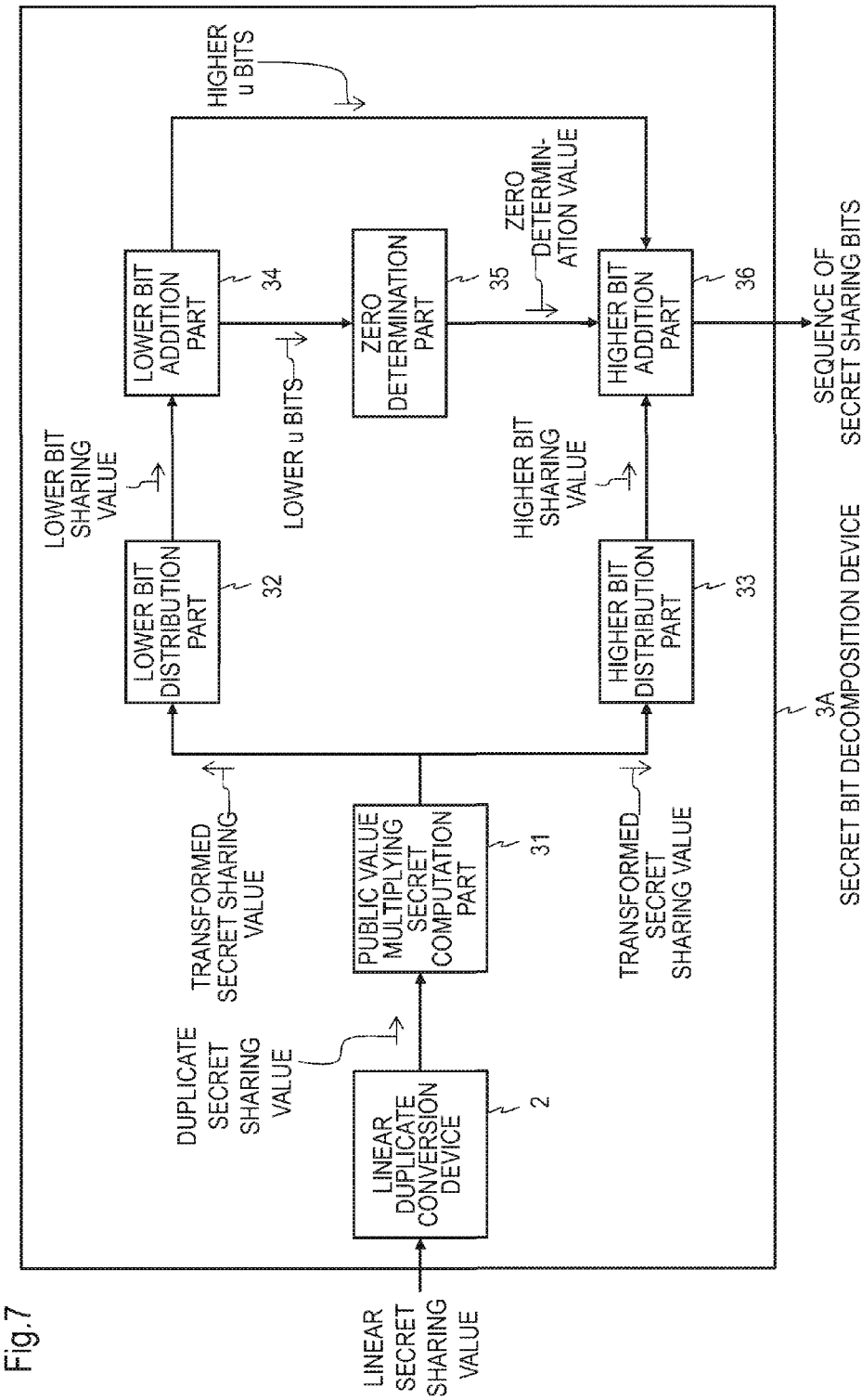
FIG. 7 is a block diagram showing a configuration of a secret bit decomposition device according to a first modification.

In the following, a secret bit decomposition device 3A, which is a modification of the secret bit decomposition device 3 according to the second embodiment, will be described with reference to FIG. 7. FIG. 7 is a block diagram showing a configuration of the secret bit decomposition device 3A according to this modification. As shown in FIG. 7, in addition to the components described above, the secret bit decomposition device 3A according to this modification comprises the linear duplicate conversion device 2 that is configured to convert the linear secret sharing value described above into a duplicate secret sharing value. Since the secret bit decomposition device 3A comprises the linear duplicate conversion device 2, the secret bit decomposition device 3A can perform secret bit decomposition even if the input to the device is a linear secret sharing value. The secret bit decomposition device 3A according to this modification may perform the secret bit decomposition processing after converting the (k, n)-linear secret sharing into the (k, k)-duplicate secret sharing or perform the secret bit decomposition processing after converting the (k, n)-linear secret sharing into the (k, n)-duplicate secret sharing.

Third Embodiment

Figure 8:
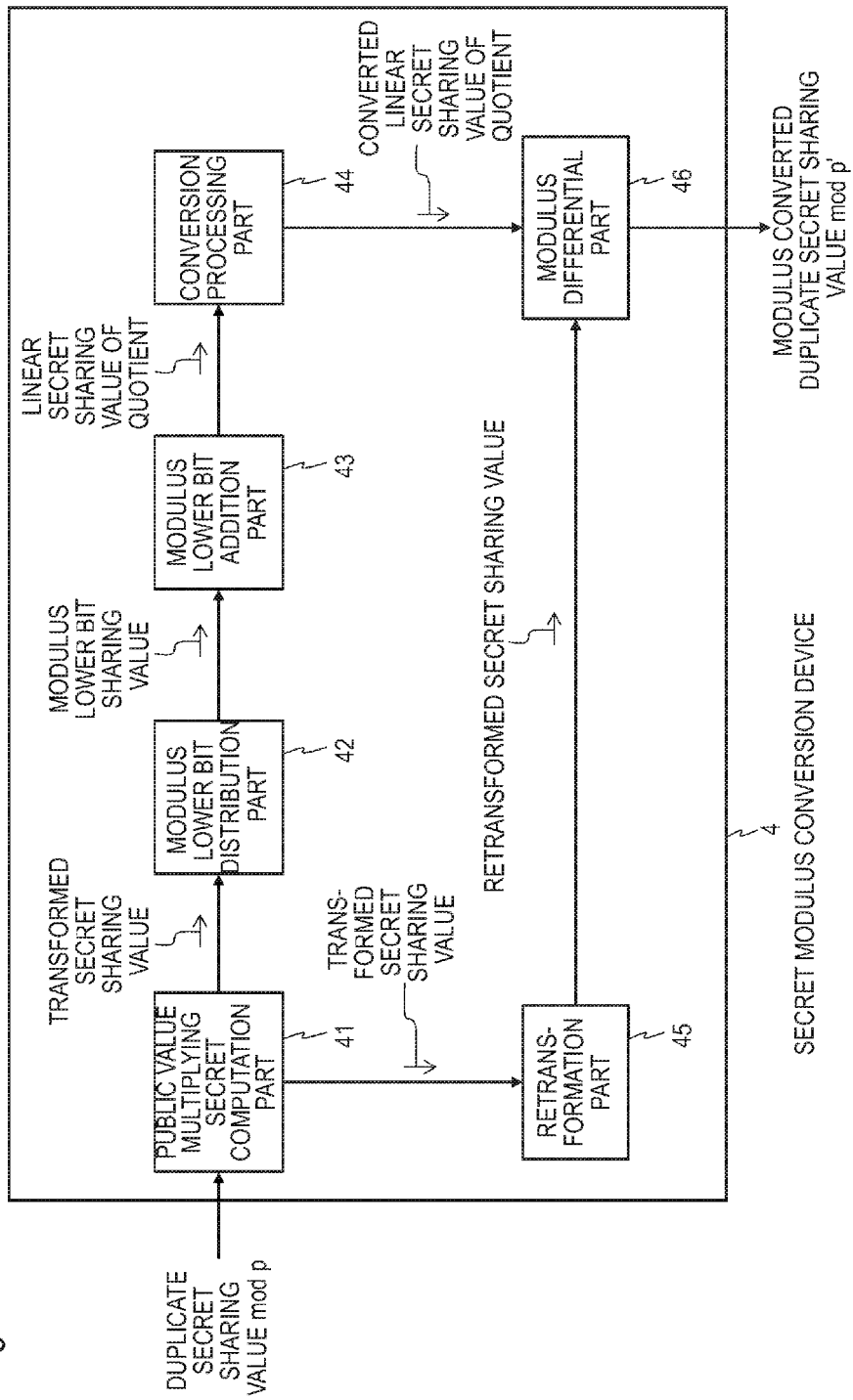
FIG. 8 is a block diagram showing a configuration of a secret modulus conversion device according to a third embodiment.
Figure 9:
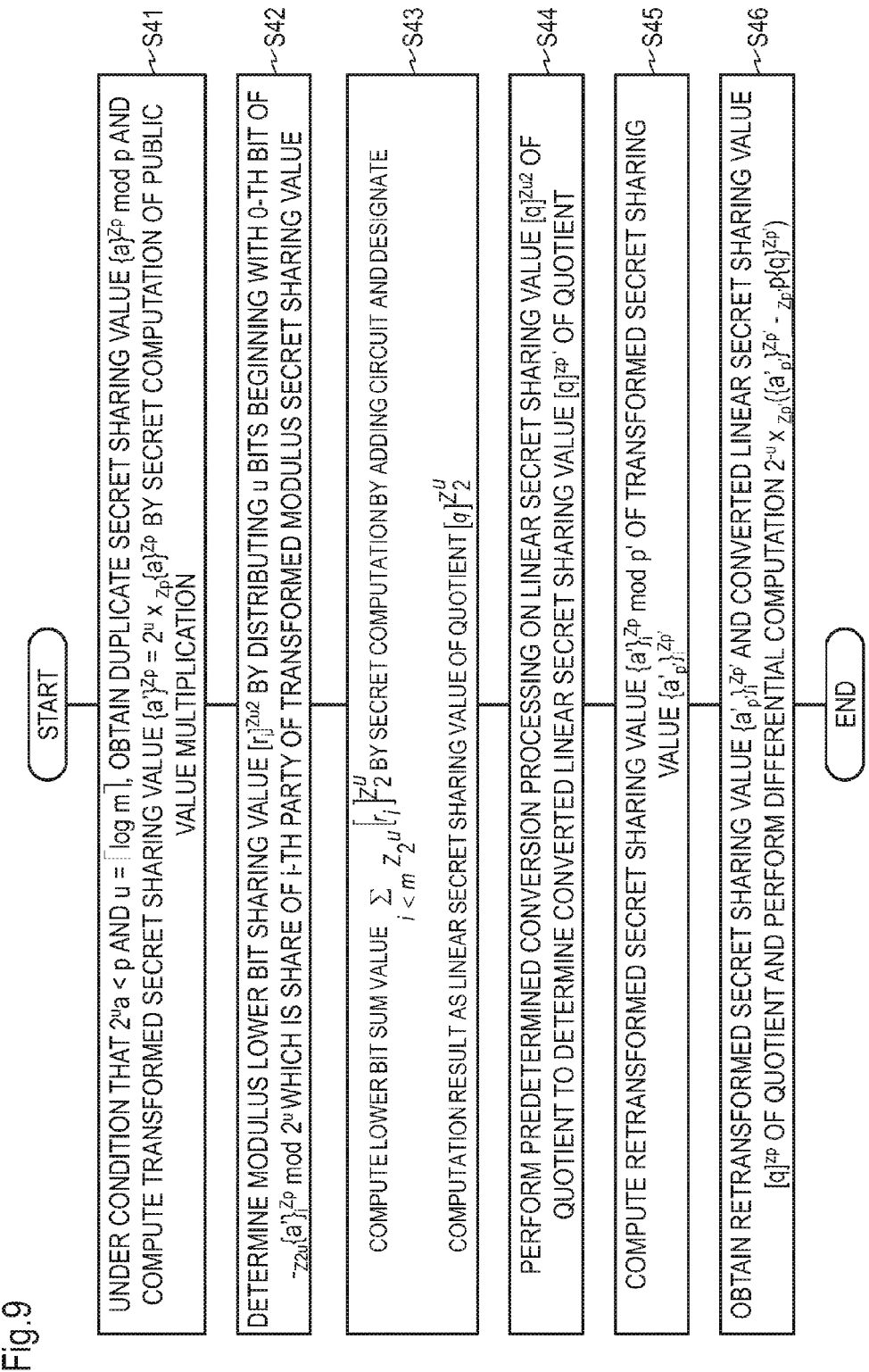
FIG. 9 is a flowchart showing an operation of the secret modulus conversion device according to the third embodiment.

In the following, a secret modulus conversion device according to a third embodiment will be described with reference to FIGS. 8 and 9. FIG. 8 is a block diagram showing a configuration of a secret modulus conversion device 4 according to this embodiment. FIG. 9 is a flowchart showing an operation of the secret modulus conversion device 4 according to this embodiment. As shown in FIG. 8, the secret modulus conversion device 4 according to this embodiment comprises a public value multiplying secret computation part 41, a modulus lower bit distribution part 42, a modulus lower bit addition part 43, a conversion processing part 44, a retransformation part 45, and a modulus differential part 46.

A modulus conversion is a processing of converting a secret sharing value in a format of a number smaller than a modulo p into another format of a number smaller than another modulo p'. In a common computer, the modulus conversion corresponds to a format conversion from a 32-bit integer into a 64-bit integer. The modulus conversion is also a processing essential for practical secret computation.

<Secret Modulus Conversion Method According to Third Embodiment>

In the following, a secret modulus conversion method performed by the secret modulus conversion device 4 according to this embodiment will be described with reference to FIG. 9. Using the formula (1), an algorithm for duplicate secret sharing according to this embodiment is derived. The traffic is |p| and is O(|p'|) bits for |p'|, which is independent of p, and the communication is fast. The duplicate secret sharing can be converted from any linear secret sharing (for details, see the description of the linear duplicate conversion device 2), and the fact that the input is limited to the format of the duplicate secret sharing is not a limitation in practice. An input to the secret modulus conversion device 4 and an output of the secret modulus conversion device 4 are as follows.

Input: duplicate secret sharing value $\{a\}^{Z_p}$ mod p, where $2^u a < p$, and $u = \lceil \log m \rceil$ Output: duplicate secret sharing value $\{a\}^{Z_{p'}}$ mod p'

Under the condition that $2^u a < p$ and $u = \lceil \log m \rceil$, the public value multiplying secret computation part 41 obtains the duplicate secret sharing value $\{a\}^{Z_p}$ mod p and computes a transformed secret sharing value $\{a'\}^{Z_p}(=2^u \times_{Z_p} \{a\}^{Z_p})$ by a secret computation of public value multiplication (S41). Subsequent steps S42, S43, S45 and S46 are performed for every i that satisfies a condition that i<m. The modulus lower bit distribution part 42 determines a modulus lower bit sharing value $[r_i]^{Z_{2^u}}$     [Formula 28]

by distributing u bits beginning with the 0-th bit of $-_{Z_{2^u}}\{a'\}_i^{Z_p} \mod 2^u$     [Formula 27]

which is the share of an i-th party of the transformed modulus secret sharing value (S42). Note that the minus sign is not assigned to $Z_p$ but to $Z_{2^u}$. The modulus lower bit addition part 43 computes a lower bit sum value

[Formula 29]

$$\sum_{i<m} z_{2^u} [r_i]_2^{z_2^u}$$

by a secret computation by the adding circuit and designates the computation result as a linear secret sharing value of the quotient $[q]^{Z_{2^u}}$     [Formula 30]

(S43). The conversion processing part 44 performs a predetermined conversion processing, such as a conversion of mod 2→mod p', on the linear secret sharing value of the quotient to determine a converted linear secret sharing value $\{q\}^{Z_{p'}}$ the quotient (S44). A specific process of the conversion of mod 2→mod p' will be described in detail below.

<Conversion mod 2→mod p (Steps 1 to 7)>

Input: $\{a\}^2$

Output: $\{a\}^{p'}$

Step 1: generate two types of secret sharing values $\{r\}^2$ and $\{r\}^{p'}$ of a plain text containing a random number r Step 2: that is, each i-th party generates a 1-bit random number r, and determines secret sharing values $\{r_i\}^2$ and $\{r_i\}^{p'}$ of two different types of $\{\bullet\}^2$ and $\{\bullet\}^{p'}$ Step 3: compute $\{r\}^2 := \oplus_{i<n} \{r_i\}^2$ $\{r\}^{p'} := \oplus_{i<n} \{r_i\}^{p'}$     [Formula 31]

by a secret computation. Note that the combination of a circle and a plus symbol represents an XOR operation, and n denotes the number of parties.

Step 4: Compute $$\{a \oplus r\}^2 \qquad \text{[Formula 32]},$$

publish the computation result, and determine $$a' := a \oplus r \qquad \text{[Formula 33]}$$

Step 5: Compute $$\{a\}^{p'} := a \oplus \{r\}^{p'} \qquad \text{[Formula 34]}$$

Step 6: that is, $$a \oplus r = 0 \text{ If, } \{a\}^{p'} := \{r\}^{p'} \qquad \text{[Formula 35]}$$

Step 7:

$$a \oplus r = 1 \text{ If, } \{a\}^{p'} := 1 - \{r\}^{p'} \qquad \text{[Formula 36]}$$

The retransformation part 45 then computes a retransformed secret sharing value mod p°

$$\{a'_{p'}\}_i^{Z_{p'}} \qquad \text{[Formula 38]}$$

of a transformed secret sharing value $$\{a'\}_i^{Z_p} \qquad \text{[Formula 37]}$$

(S45). Note that, from the formula (1), the following formula holds.

[Formula 39]

$$a'_{p'} \equiv_{p'} 2^u a + qp$$

The modulus differential part 46 obtains the retransformed secret sharing value and the converted linear secret sharing value of the quotient, performs a differential computation $$2^{-u} \times_{Z_{p'}} (\{a'_{p'}\}^{Z_{p'}} -_{Z_{p'}} p\{q\}^{Z_{p'}}) \qquad \text{[Formula 40]}$$

by a secret computation of addition and public value multiplication, and outputs the result (S46).

[Modification 2]

Figure 10:
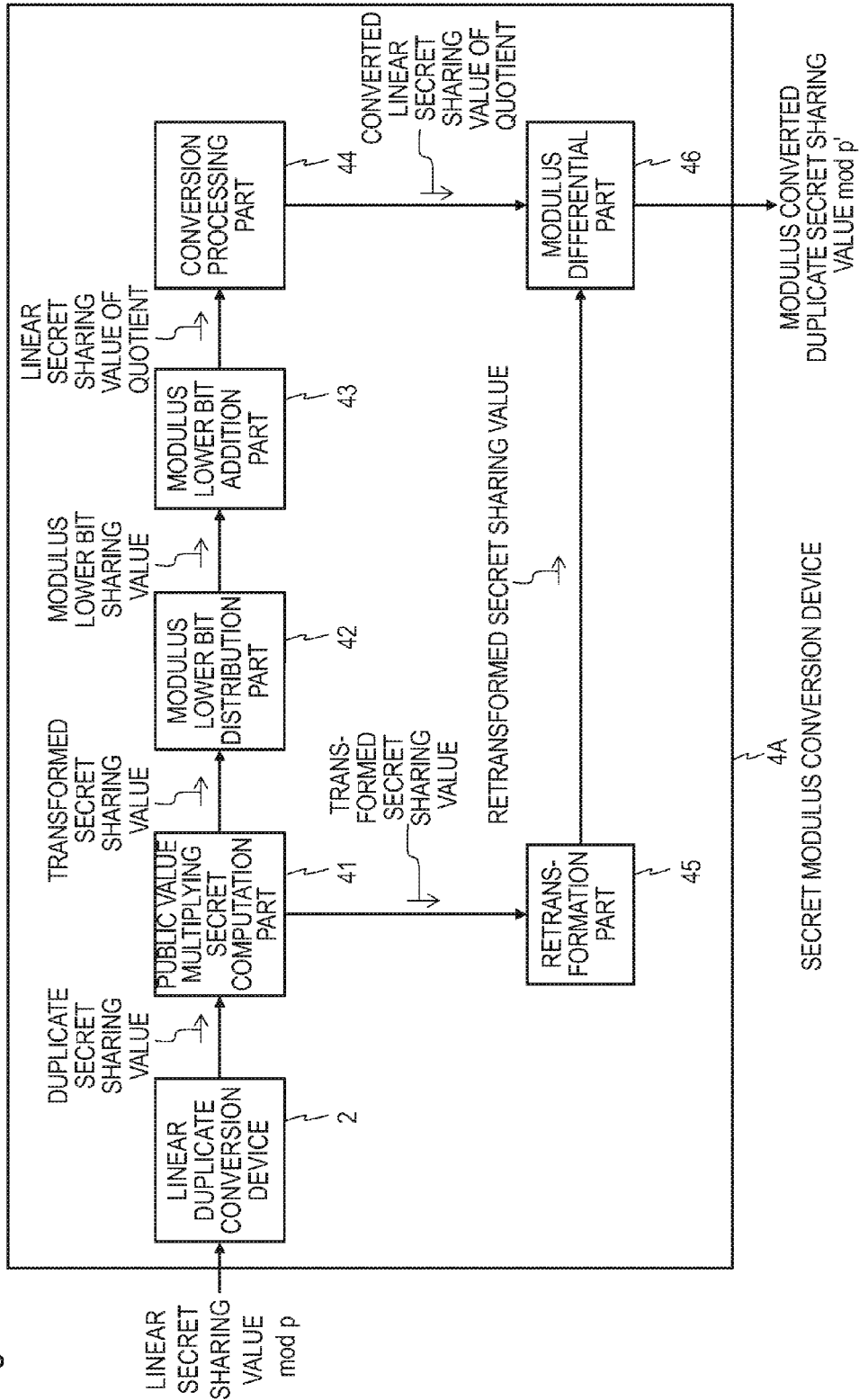
FIG. 10 is a block diagram showing a configuration of a secret modulus conversion device according to a second modification.

In the following, a secret modulus conversion device 4A, which is a modification of the secret modulus conversion device 4 according to the third embodiment, will be described with reference to FIG. 10. FIG. 10 is a block diagram showing a configuration of the secret modulus conversion device 4A according to this modification. As shown in FIG. 10, in addition to the components described above, the secret modulus conversion device 4A according to this modification comprises the linear duplicate conversion device 2 that is configured to convert the linear secret sharing value described above into a duplicate secret sharing value. Since the secret modulus conversion device 4A comprises the linear duplicate conversion device 2, the secret modulus conversion device 4A can perform secret modulus conversion even if the input to the device is a linear secret sharing value. The secret modulus conversion device 4A according to this modification may perform the secret modulus conversion processing after converting the (k, n)-linear secret sharing into the (k, k)-duplicate secret sharing or perform the secret modulus conversion processing after converting the (k, n)-linear secret sharing into the (k, n)-duplicate secret sharing.

<Main Point of Invention>

A main point of the present invention is that both the bit decomposition and the modulus conversion are closely related to the share quotient computation, and a concept of quotient transfer is created as an alternative to the conventional computation using a |p|-bit adding circuit to enable computation using a log m-bit circuit that does not depend on |p|. The quotient transfer is a novel technique provided by the present invention that involves shifting a quotient that would otherwise appear as a higher bit of the addition result to a lower bit of the addition result by taking advantage of the properties the integer remainder. The traffic is markedly improved in efficiency from $O(|p|^2)$ to $O(1)$ for |p| for the share quotient computation, the bit decomposition and the modulus conversion. For example, in the case where |p|=31, and l=2 (that is, a 31-bit integer stores 2-bit data), the processing speed is approximately 2600 times higher than the conventional fastest implementation (see Reference non-patent literature 2, Drawing "shiftR").

(Reference non-patent literature 2) D. Bogdanov, M. Niitsoo, T. Toft, and J. Willemson. High-performance secure multi-party computation for data mining applications. Int. J. Inf. Sec., 11(6): 403-418, 2012.

The various processings described above can be performed not only sequentially in the order described above but also in parallel with each other or individually as required or depending on the processing power of the device that performs the processings. Furthermore, of course, other various modifications can be appropriately made to the processings without departing form the spirit of the present invention.

In the case where the configurations described above are implemented by a computer, the specific processings to be performed by the functions of each device are described in a program. The computer executes the program to implement the processing functions described above.

The program that describes the specific processings can be recorded in a computer-readable recording medium. The computer-readable recording medium may be any type of recording medium, such as a magnetic recording device, an optical disk, a magneto-optical recording medium or a semiconductor memory.

The program may be distributed by selling, transferring or lending a portable recording medium, such as a DVD or a CD-ROM, in which the program is recorded, for example. Alternatively, the program may be distributed by storing the program in a storage device in a server computer and transferring the program from the server computer to other computers via a network.

The computer that executes the program first temporarily stores, in a storage device thereof, the program recorded in a portable recording medium or transferred from a server computer, for example. When performing the processings, the computer reads the program from the recording medium and performs the processings according to the read program. In an alternative implementation, the computer may read the program directly from the portable recording medium and perform the processings according to the program. As a further alternative, the computer may perform the processings according to the program each time the computer receives the program transferred from the server computer. As a further alternative, the processings described above may be performed on an application service provider (ASP) basis, in which the server computer does not transmit the program to the computer, and the processings are implemented only through execution instruction and result acquisition. The programs according to the embodiments of the present invention include a quasi-program, which is information to be processed by a computer (such as data that is not a direct instruction to a computer but has a property that defines the processings performed by the computer).

Although the devices according to the embodiments of the present invention have been described as being implemented by a computer executing a predetermined program, at least part of the specific processing may be implemented by hardware.

What is claimed is:

1. A secret quotient transfer device comprising:
processing circuitry configured to
receive a bit representation of each of m sub-shares $x_0, \ldots, x_{m-1}$ of an original plain text electronic message from a plurality of devices which perform secret sharing of the sub-shares such that each sub-share is concealed within each respective one of the plurality of devices and at least a sub-set of the plurality of devices are required to reconstruct the original plain text electronic message, and
compute a quotient q according to

[Formula 45]

$$q = -\sum_{i<m} x_i \mod 2^u, \quad (1)$$

on the assumption that

[Formula 41]

$$x \equiv_y z$$

is a symbol that expresses that integers x and z are congruent modulo y,
u denotes a natural number and represents a boundary value, m denotes an integer that satisfies a relation $m \leq 2^u$, i denotes an integer from 0 to m−1, a plain text a is an integer that is equal to or greater than 0 and smaller than an arbitrary modulo p and satisfies a relation

[Formula 42]

$$a \equiv_{2^u} 0,$$

the a is expressed as a sum of the m sub-shares $x_0, \ldots, x_{m-1}$ as

[Formula 43]

$$a \equiv_p \sum_{i<m} x_i,$$

a total sum $a_Z$ of the sub-shares is expressed as

[Formula 44]

$$a_Z = \sum_{i<m} x_i,$$

and the q is a quotient of a division of the total sum $a_Z$ of the sub-shares by p.

2. A secret bit decomposition device, wherein it is assumed that p denotes a Mersenne prime number, m denotes an integer that satisfies a relation $m \leq 2^u$, a boundary value u that is a natural number is denoted as $\lceil \log m \rceil$, i denotes an integer from 0 to m−1, j denotes an integer from 0 to m−1, [P] denotes an operator that converts whether any proposition P is true or false into an integer, a linear secret sharing value of a plain text a is denoted as [a], a duplicate secret sharing value of the plain text a is denoted as {a}, the plain text a is an integer that is equal to or greater than 0 and smaller than an arbitrary modulo p and satisfies a relation

[Formula 46]

$$a \equiv_{2^u} 0,$$

and the plain text a is expressed as a sum of m sub-shares $x_0, \ldots, x_{m-1}$ as

[Formula 47]

$$a \equiv_p \sum_{i<m} x_i,$$

and the secret bit decomposition device comprises:
processing circuitry configured to
obtain, under a condition that $2^u a < p$, a duplicate secret sharing value $\{a\}^{Zp}$ and computes a transformed secret sharing value $\{a'\}^{Zp}$ $(=2^u \times_{Zp} \{a\}^{Zp})$ by a secret computation of public value multiplication, wherein a plurality of devices perform secret sharing of sub-shares of the original plain text electronic message a such that each sub-share is concealed within each respective one of the plurality of devices and at least a sub-set of the plurality of devices are required to reconstruct the original plain text electronic message a;
determine a lower bit sharing value $$[r_i]^{Z_2^u} \quad \text{[Formula 48]}$$

by distributing u bits beginning with a 0-th bit of a j-th sub-share $\{a'\}^{Zp}<j>$ of the transformed secret sharing value for all i that satisfies a condition that i<m;
determine a higher bit sharing value $$[q_i]^{Z_2^l} \quad \text{[Formula 49]}$$

by distributing l bits beginning with an u-th bit of the j-th sub-share $\{a'\}^{Zp}<j>$ of the transformed secret sharing value for all i that satisfies a condition that i<m;
compute a lower bit sum value

[Formula 50]

$$\sum_{i<m} z_{2^u} [r_i]^{Z_2^u}$$

by a secret computation by an adding circuit,
it being assumed that lower u bits of the lower bit sum value is denoted as, $$[r_u]^{Z_2^u} \quad \text{[Formula 51]}$$

and higher u bits of the lower bit sum value is denoted as $$[q_u]^{Z_2^u} \quad \text{[Formula 52]}$$

obtain the lower u bits of the lower bit sum value and compute a zero determination value $[[r_u \neq 0]]^{Z_2}$ by a secret computation by a zero determining circuit; and obtain the higher bit sharing value, the higher u bits of the lower bit sum value and the zero determination value for all i that satisfies a condition that i<m, computes a sequence of secret sharing bit values

[Formula 53]
$$[a \mod 2^l]^{Z_2^l} = \sum_{i<m} Z_{2^l}[q_i]^{Z_2^l} + Z_{2^l}[q_u]^{Z_2^u} + Z_{2^l}[[r_u \neq 0]]^{Z_2}$$

by a secret computation by the adding circuit, and output the computation result.

3. A secret modulus conversion device, wherein it is assumed that p denotes a Mersenne prime number, m denotes an integer that satisfies a relation $m \leq 2^u$, a boundary value u that is a natural number is denoted as $\lceil \log m \rceil$, i denotes an integer from 0 to m−1, j denotes an integer from 0 to m−1, [P] denotes an operator that converts whether any proposition P is true or false into an integer, a linear secret sharing value of a plain text a is denoted as [a], a duplicate secret sharing value of the plain text a is denoted as {a}, the plain text a is an integer that is equal to or greater than 0 and smaller than an arbitrary modulo p and satisfies a relation

[Formula 54]
$$a \equiv 0,$$
$$\quad 2^u$$

and the plain text a is expressed as a sum of m sub-shares $x_0, \ldots, x_{m-1}$ as

[Formula 55]
$$a \equiv \sum_{i<m} x_i,$$
$$\quad p$$

and the secret modulus conversion device comprises:
a public value multiplying secret computation part that, under a condition that $2^u a < p$, obtains a duplicate secret sharing value $\{a\}^{Z_p}$ mod p and computes a transformed secret sharing value $\{a'\}^{Z_p}$ ($=2^u \times_{Z_p} \{a\}^{Z_p}$) by a secret computation of public value multiplication, wherein a plurality of devices perform secret sharing of sub-shares of the original plain text electronic message a such that each sub-share is concealed within each respective one of the plurality of devices and at least a sub-set of the plurality of devices are required to reconstruct the original plain text electronic message a;
a modulus lower bit distribution part that determines a modulus lower bit sharing value $[r_i]^{Z_2^u}$ [Formula 57]

by distributing u bits beginning with a 0-th bit of a share of an i-th party $-Z_{2^u}\{a'\}_i^{Z_p} \mod 2^u$ [Formula 56]

of a transformed modulus secret sharing value for all i that satisfies a condition that i<m;
a modulus lower bit addition part that computes a lower bit sum value

[Formula 58]
$$\sum_{i<m} Z_{2^u}[r_i]^{Z_2^u}$$

by a secret computation by an adding circuit for all i that satisfies a condition that i<m and designates the computation result as a linear secret sharing value of a quotient $[q]^{Z_2^u}$; [Formula 59]

a conversion processing part that performs a predetermined conversion processing, such as a conversion of mod 2→mod p', on the linear secret sharing value of the quotient to determine a converted linear secret sharing value {q}− of the quotient;
a retransformation part that computes a retransformed secret sharing value mod p'

$\{a'_{p'}\}_i^{Z_{p'}}$ [Formula 61]

of the transformed secret sharing value $\{a'\}_i^{Z_p}$ [Formula 60]

for all i that satisfies a condition that i<m; and
a modulus differential part that obtains the retransformed secret sharing value and the converted linear secret sharing value of the quotient, performs a differential computation $2^{-u} \times_{Z_{p'}} (\{a'_{p'}\}^{Z_{p'}} -_{Z_{p'}} p\{q\}^{Z_{p'}})$ [Formula 62]

by a secret computation of addition and public value multiplication, and outputs the computation result.

4. A secret quotient transfer method, implemented by a secret quotient transfer device, comprising:
receiving, by processing circuitry of the secret quotient transfer device, a bit representation of each of m sub-shares $x_0, \ldots, x_{m-1}$ of an original plain text electronic message from a plurality of devices which perform secret sharing of the sub-shares such that each sub-share is concealed within each respective one of the plurality of devices and at least a sub-set of the plurality of devices are required to reconstruct the original plain text electronic message; and
computing, by the processing circuitry, a quotient q according to

[Formula 67]
$$q = -\sum_{i<m} x_i \mod 2^u, \quad (1)$$

on the assumption that

[Formula 63]
$$x \equiv z$$
$$\quad y$$

is a symbol that expresses that integers x and z are congruent modulo y,
u denotes a natural number and represents a boundary value, m denotes an integer that satisfies a relation $m \leq 2^u$, i denotes an integer from 0 to m−1, a plain text a is an integer that is equal to or greater than 0 and smaller than an arbitrary modulo p and satisfies a relation

[Formula 64]
$$a \equiv_{2^u} 0,$$

the plain text a is expressed as a sum of m sub-shares $x_0, \ldots, x_{m-1}$ as

[Formula 65]
$$a \equiv_p \sum_{i<m} x_i,$$

a total sum $a_Z$ of the sub-shares is expressed as

[Formula 66]
$$a_Z = \sum_{i<m} x_i,$$

and the q is a quotient of a division of the total sum $a_Z$ of the sub-shares by p.

5. A secret bit decomposition method, implemented by a secret bit decomposition device, wherein it is assumed that p denotes a Mersenne prime number, m denotes an integer that satisfies a relation $m \leq 2^u$, a boundary value u that is a natural number is denoted as $\lceil \log m \rceil$, i denotes an integer from 0 to m−1, j denotes an integer from 0 to m−1, [P] denotes an operator that converts whether any proposition P is true or false into an integer, a linear secret sharing value of a plain text a is denoted as [a], a duplicate secret sharing value of the plain text a is denoted as {a}, the plain text a is an integer that is equal to or greater than 0 and smaller than an arbitrary modulo p and satisfies a relation

[Formula 68]
$$a \equiv_{2^u} 0,$$

and the plain text a is expressed as a sum of m sub-shares $x_0, \ldots, x_{m-1}$ as

[Formula 69]
$$a \equiv_p \sum_{i<m} x_i,$$

and the secret bit decomposition method comprises:
a public value multiplying secret computation step of, under a condition that $2^u$ a<p, obtaining, by processing circuitry of the secret bit decomposition device, a duplicate secret sharing value $\{a\}^{Zp}$ and computing a transformed secret sharing value $\{a'\}^{Zp}$ ($=2^u \times_{Z_p} \{a\}^{Zp}$) by a secret computation of public value multiplication, wherein a plurality of devices perform secret sharing of sub-shares of the original plain text electronic message a such that each sub-share is concealed within each respective one of the plurality of devices and at least a sub-set of the plurality of devices are required to reconstruct the original plain text electronic message a;
a lower bit distribution step of determining, by the processing circuitry, a lower bit sharing value

[Formula 70]
$$[r_i]^{Z_2^u}$$

by distributing u bits beginning with a 0-th bit of a j-th sub-share $\{a'\}^{Zp}<j>$ of the transformed secret sharing value for all i that satisfies a condition that i<m;
a higher bit distribution step of determining, by the processing circuitry, a higher bit sharing value

[Formula 71]
$$[q_i]^{Z_2^l}$$

by distributing l bits beginning with an u-th bit of the j-th sub-share $\{a'\}^{Zp}<j>$ of the transformed secret sharing value for all i that satisfies a condition that i<m;
a lower bit addition step of computing a lower bit sum value

[Formula 72]
$$\sum_{i<m} Z_{2^{2u}}[r_i]^{Z_2^u}$$

by a secret computation by an adding circuit,
it being assumed that lower u bits of the lower bit sum value is denoted as,

[Formula 73]
$$[r_u]^{Z_2^u}$$

and higher u bits of the lower bit sum value is denoted as

[Formula 74]
$$[q_u]^{Z_2^u};$$

a zero determination step of obtaining the lower u bits of the lower bit sum value and computing a zero determination value $[[r_u \neq 0]]^{Z_2}$ by a secret computation by a zero determining circuit; and
a higher bit addition step of obtaining the higher bit sharing value, the higher u bits of the lower bit sum value and the zero determination value for all i that satisfies a condition that i<m, computing a sequence of secret sharing bit values

[Formula 75]
$$[a \mod 2^l]^{Z_2^l} = \sum_{i<m} Z_{2^l}[q_i]^{Z_2^l} + z_{2^l}[q_u]^{Z_2^u} + Z_{2^l}[[r_u \neq 0]]^{Z_2}$$

by a secret computation by the adding circuit, and outputting the computation result.

6. A secret modulus conversion method, implemented by a secret modulus conversion device, wherein it is assumed that p denotes a Mersenne prime number, m denotes an integer that satisfies a relation $m \leq 2^u$, a boundary value u that is a natural number is denoted as $\lceil \log m \rceil$, i denotes an integer from 0 to m−1, j denotes an integer from 0 to m−1, [P] denotes an operator that converts whether any proposition P is true or false into an integer, a linear secret sharing value of a plain text a is denoted as [a], a duplicate secret sharing value of the plain text a is denoted as {a}, the plain text a is an integer that is equal to or greater than 0 and smaller than an arbitrary modulo p and satisfies a relation

[Formula 76]

$$a \equiv_{2^u} 0,$$

and the plain text a is expressed as a sum of m sub-shares $x_0, \ldots, x_{m-1}$ as

[Formula 77]

$$a \equiv_p \sum_{i<m} x_i,$$

and the secret modulus conversion method comprises:

a public value multiplying secret computation step of, under a condition that $2^u a < p$, obtaining, by processing circuitry of the secret modulus conversion device, a duplicate secret sharing value $\{a\}^{Zp}$ mod p and computing a transformed secret sharing value $\{a'\}^{Zp}$ $(=2^u \times_{Zp} \{a\}^{Zp})$ by a secret computation of public value multiplication wherein a plurality of devices perform secret sharing of sub-shares of the original plain text electronic message a such that each sub-share is concealed within each respective one of the plurality of devices and at least a sub-set of the plurality of devices are required to reconstruct the original plain text electronic message a;

a modulus lower bit distribution step of determining, by the processing circuitry, a modulus lower bit sharing value $$[r_i]^{Z_2^u} \qquad \text{[Formula 79]}$$

by distributing u bits beginning with a 0-th bit of a share of an i-th party $$-_{Z_2^u}\{a'\}_i^{Zp} \bmod 2^u \qquad \text{[Formula 78]}$$

of a transformed modulus secret sharing value for all i that satisfies a condition that i<m;

a modulus lower bit addition step of computing, by the processing circuitry, a lower bit sum value

[Formula 80]

$$\sum_{i<m} Z_{2^u}[r_i]^{Z_2^u}$$

by a secret computation by an adding circuit for all i that satisfies a condition that i<m and designating the computation result as a linear secret sharing value of a quotient $$[q]^{Z_2^u}; \qquad \text{[Formula 81]}$$

a conversion processing step of performing, by the processing circuitry, a predetermined conversion processing, such as a conversion of mod 2→mod p', on the linear secret sharing value of the quotient to determine a converted linear secret sharing value $\{q\}^{Zp'}$ of the quotient;

a retransformation step of computing, by the processing circuitry, a retransformed secret sharing value mod p'

$$\{a'_{p'}\}_i^{Zp'} \qquad \text{[Formula 83]}$$

of the transformed secret sharing value $$\{a'\}_i^{Zp} \qquad \text{[Formula 82]}$$

for all i that satisfies a condition that i<m; and a modulus differential step of obtaining, by the processing circuitry, the retransformed secret sharing value and the converted linear secret sharing value of the quotient, performing a differential computation $$2^{-u} \times_{Zp'} (\{a'_{p'}\}^{Zp'} -_{Zp'} p\{q\}^{Zp'}) \qquad \text{[Formula 84]}$$

by a secret computation of addition and public value multiplication, and outputting the computation result.

7. A non-transitory computer readable medium storing a computer program that makes a secret quotient transfer device perform a method comprising receiving, by processing circuitry of the secret quotient transfer device, a bit representation of each of m sub-shares $x_0, \ldots, x_{m-1}$ of an original plain text electronic message from a plurality of devices which perform secret sharing of the sub-shares such that each sub-share is concealed within each respective one of the plurality of devices and at least a sub-set of the plurality of devices are required to reconstruct the original plain text electronic message; and computing a quotient q according to

[Formula 67]

$$q = -\sum_{i<m} x_i \bmod 2^u, \qquad (1)$$

on the assumption that

[Formula 63]

$$x \equiv_y z$$

is a symbol that expresses that integers x and z are congruent modulo y, u denotes a natural number and represents a boundary value, m denotes an integer that satisfies a relation $m \leq 2^u$, i denotes an integer from 0 to m−1, a plain text a is an integer that is equal to or greater than 0 and smaller than an arbitrary modulo p and satisfies a relation

[Formula 64]

$$a \equiv_{2^u} 0,$$

the plain text a is expressed as a sum of m sub-shares $x_0, \ldots, x_{m-1}$ as

[Formula 65]

$$a \equiv_p \sum_{i<m} x_i,$$

a total sum $a_Z$ of the sub-shares is expressed as

[Formula 66]
$$a_Z = \sum_{i<m} x_i,$$

and the q is a quotient of a division of the total sum $a_Z$ of the sub-shares by p.

8. A non-transitory computer readable medium storing a computer program that makes a computer function as a secret bit decomposition device perform a method wherein it is assumed that p denotes a Mersenne prime number, m denotes an integer that satisfies a relation $m \leq 2^u$, a boundary value u that is a natural number is denoted as $\lceil \log m \rceil$, i denotes an integer from 0 to m−1, j denotes an integer from 0 to m−1, [P] denotes an operator that converts whether any proposition P is true or false into an integer, a linear secret sharing value of a plain text a is denoted as [a], a duplicate secret sharing value of the plain text a is denoted as {a}, the plain text a is an integer that is equal to or greater than 0 and smaller than an arbitrary modulo p and satisfies a relation

[Formula 68]
$$a \underset{2^u}{\equiv} 0,$$

and the plain text a is expressed as a sum of m sub-shares $x_0, \ldots, x_{m-1}$ as

[Formula 69]
$$a \underset{p}{\equiv} \sum_{i<m} x_i,$$

the method comprising:
a public value multiplying secret computation step of, under a condition that $2^u a < p$, obtaining, by processing circuitry of the secret bit decomposition device, a duplicate secret sharing value $\{a\}^{Zp}$ and computing a transformed secret sharing value $\{a'\}^{Zp}$ ($=2^u \times_{Zp} \{a\}^{Zp}$) by a secret computation of public value multiplication, wherein a plurality of devices perform secret sharing of sub-shares of the original plain text electronic message a such that each sub-share is concealed within each respective one of the plurality of devices and at least a sub-set of the plurality of devices are required to reconstruct the original plain text electronic message a;
a lower bit distribution step of determining, by the processing circuitry, a lower bit sharing value $[r_i]^{Z_{2^u}}$ [Formula 70]

by distributing u bits beginning with a 0-th bit of a j-th sub-share $\{a'\}^{Zp}<j>$ of the transformed secret sharing value for all i that satisfies a condition that i<m,
a higher bit distribution step of determining, by the processing circuitry, a higher bit sharing value $[q_i]^{Z_{2^l}}$ [Formula 71]

by distributing l bits beginning with an u-th bit of the j-th sub-share $\{a'\}^{Zp}<j>$ of the transformed secret sharing value for all i that satisfies a condition that i<m;
a lower bit addition step of computing a lower bit sum value

[Formula 72]
$$\sum_{i<m} Z_{2^{2u}}[r_i]^{Z_2^u}$$

by a secret computation by an adding circuit,
it being assumed that lower u bits of the lower bit sum value is denoted as, $[r_u]^{Z_2^u}$ [Formula 73]

and higher u bits of the lower bit sum value is denoted as $[q_u]^{Z_2^u}$; [Formula 74]

a zero determination step of obtaining the lower u bits of the lower bit sum value and computing a zero determination value $[[r_u \neq 0]]^{Z_2}$ by a secret computation by a zero determining circuit and
a higher bit addition step of obtaining the higher bit sharing value, the higher u bits of the lower bit sum value and the zero determination value for all i that satisfies a condition that i<m, computing a sequence of secret sharing bit values

[Formula 75]
$$[a \bmod 2^l]^{Z_2^l} = \sum_{i<m} Z_{2^l}[q_i]^{Z_2^l} + Z_{2^l}[q_u]^{Z_2^l} + Z_{2^l}[[r_u \neq 0]]^{Z_2}$$

by a secret computation by the adding circuit, and outputting the computation result.

9. A non-transitory computer readable medium storing a computer program that makes a secret modulus conversion device perform a method wherein it is assumed that p denotes a Mersenne prime number, m denotes an integer that satisfies a relation $m \leq 2^u$, a boundary value u that is a natural number is denoted as $\lceil \log m \rceil$, i denotes an integer from 0 to m−1, j denotes an integer from 0 to m−1, [P] denotes an operator that converts whether any proposition P is true or false into an integer, a linear secret sharing value of a plain text a is denoted as [a], a duplicate secret sharing value of the plain text a is denoted as {a}, the plain text a is an integer that is equal to or greater than 0 and smaller than an arbitrary modulo p and satisfies a relation

[Formula 76]
$$a \underset{2^u}{\equiv} 0,$$

and the plain text a is expressed as a sum of m sub-shares $x_0, \ldots, x_{m-1}$ as

[Formula 77]
$$a \underset{p}{\equiv} \sum_{i<m} x_i,$$

the method comprising:
a public value multiplying secret computation step of, under a condition that $2^u a < p$, obtaining, by processing circuitry of the secret modulus conversion device, a duplicate secret sharing value $\{a\}^{Zp}$ mod p and computing a transformed secret sharing value $\{a'\}^{Zp}$ ($=2^u \times_{Z_p} \{a\}^{Z_p}$) by a secret computation of public value multiplication, wherein a plurality of devices perform secret sharing of sub-shares of the original plain text electronic message a such that each sub-share is concealed within each respective one of the plurality of devices and at least a sub-set of the plurality of devices are required to reconstruct the original plain text electronic message a;

a modulus lower bit distribution step of determining, by the processing circuitry, a modulus lower bit sharing value $$[r_i]^{Z_2^u} \qquad \text{[Formula 79]}$$

by distributing u bits beginning with a 0-th bit of a share of an i-th party $$-_{Z_2^u}\{a'\}_i^{Z_p} \bmod 2^u \qquad \text{[Formula 78]}$$

of a transformed modulus secret sharing value for all i that satisfies a condition that i≤m;

a modulus lower bit addition step of computing, by the processing circuitry, a lower bit sum value

[Formula 80]
$$\sum_{i<m} {}_{Z_2^u}[r_i]^{Z_2^u}$$

by a secret computation by an adding circuit for all i that satisfies a condition that i<m and designating the computation result as a linear secret sharing value of a quotient $$[q_u]^{Z_2^u}; \qquad \text{[Formula 81]}$$

a conversion processing step of performing, by the processing circuitry, a predetermined conversion processing, such as a conversion of mod 2→mod p', on the linear secret sharing value of the quotient to determine a converted linear secret sharing value $\{q\}^{Z_{p'}}$ of the quotient a retransformation step of computing, by the processing circuitry, a retransformed secret sharing value mod p'

$$\{a'_{p'}\}_i^{Z_{p'}} \qquad \text{[Formula 83]}$$

of the transformed secret sharing value $$\{a'\}_i^{Z_p} \qquad \text{[Formula 82]}$$

for all i that satisfies a condition that i<m; and a modulus differential step of obtaining the retransformed secret sharing value and the converted linear secret sharing value of the quotient, performing a differential computation $$2^{-u} \times_{Z_{p'}} (\{a'_{p'}\}^{Z_{p'}} -_{Z_{p'}} p\{q\}^{Z_{p'}}) \qquad \text{[Formula 84]}$$

by a secret computation of addition and public value multiplication, and outputting the computation result.

* * * * *